(12) United States Patent
Kurabayashi et al.

(10) Patent No.: US 10,948,043 B2
(45) Date of Patent: Mar. 16, 2021

(54) DAMPING DEVICE FOR STRUCTURE

(71) Applicants: Hiroshi Kurabayashi, Tokyo (JP); SANSEI AIR DANSHIN SYSTEM, LTD., Tokyo (JP); OHMOTO GUMI CO., LTD., Okayama (JP); KONKUK UNIVERSITY INDUSTRIAL COOPERATION CORP, Seoul (KR); Gradient Wind Engineering Inc., Ottawa (CA)

(72) Inventors: Hiroshi Kurabayashi, Tokyo (JP); Shoichi Sakamoto, Tokyo (JP)

(73) Assignees: Hiroshi Kurabayashi, Tokyo (JP); SANSEI AIR DANSHIN SYSTEM, LTD., Tokyo (JP); OHMOTO GUMI CO., LTD., Okayama (JP); KONKUK UNIVERSITY INDUSTRIAL COOPERATION CORP, Seoul (KR); GRADIENT WIND ENGINEERING INC., Ottawa (CA)

(*) Notice: Subject to any disclaimer, the term of this patent is extended or adjusted under 35 U.S.C. 154(b) by 0 days.

(21) Appl. No.: 16/149,350

(22) Filed: Oct. 2, 2018

(65) Prior Publication Data

US 2020/0102996 A1    Apr. 2, 2020

(51) Int. Cl.
*F16F 7/10*      (2006.01)
*F16F 7/116*    (2006.01)
(Continued)

(52) U.S. Cl.
CPC ......... *F16F 7/1028* (2013.01); *E04H 9/0215* (2020.05); *F16F 7/112* (2013.01);
(Continued)

(58) Field of Classification Search
CPC .......... F16F 7/104; F16F 7/116; F16F 7/1028; F16F 15/1414; F16F 15/145;
(Continued)

(56) References Cited

U.S. PATENT DOCUMENTS 5,467,720 A * 11/1995 Korenaga ............. G03F 7/2039
108/147
5,760,564 A * 6/1998 Novak ................ G03F 7/70716
318/687

(Continued)

FOREIGN PATENT DOCUMENTS

JP    2011-202769 A    10/2011

*Primary Examiner* — Bradley T King
*Assistant Examiner* — Mahbubur Rashid
(74) *Attorney, Agent, or Firm* — Tracy M Heims; Apex Juris, PLLC.

(57) ABSTRACT

A damping device for structure includes a base frame installed on a target place, an air floating mass disposed on the base frame to blow off air, a TMD mass disposed above the base frame to float with an air pressure, one pair of guiderail units disposed on X-direction both sides of the base frame along the X direction respectively, slider units disposed to be slidable in the X direction relative to the guiderail units, coupled to each X-direction side face of the TMD mass and each including a slider moving up/down mechanism part which moves down a slider when the TMD mass floats, an oil damper attached to the base frame to exert an attenuation action on the TMD mass and a coil spring attached to the base frame to exert a restoration action on the TMD mass.

3 Claims, 11 Drawing Sheets

(51) Int. Cl.
*F16F 7/112* (2006.01)
*F16F 9/10* (2006.01)
*F16F 9/19* (2006.01)
*E04H 9/02* (2006.01)

(52) U.S. Cl.
CPC .............. *F16F 7/116* (2013.01); *F16F 9/103* (2013.01); *F16F 9/19* (2013.01); *F16F 2222/08* (2013.01); *F16F 2222/12* (2013.01); *F16F 2232/08* (2013.01); *F16F 2238/026* (2013.01); *F16F 2238/04* (2013.01)

(58) Field of Classification Search
CPC .......... F16F 2224/02; F16F 7/112; F16F 9/19; F16F 2222/08; F16F 2222/12; F16F 2232/08; F16F 2238/026; F16F 2238/04; F16F 15/02; F16F 15/04; F16F 15/027; E04H 9/02
See application file for complete search history.

(56) References Cited

U.S. PATENT DOCUMENTS

| | | | | |
|---|---|---|---|---|
| 6,065,741 | A * | 5/2000 | Davis | F16F 9/0209 188/322.19 |
| 6,510,755 | B1 * | 1/2003 | Higuchi | F16C 29/025 384/12 |
| 6,512,571 | B2 * | 1/2003 | Hara | G03F 7/70725 355/53 |
| 6,547,225 | B1 * | 4/2003 | Nelson | F16F 9/049 248/631 |
| 6,990,386 | B2 * | 1/2006 | Tanaka | G03F 7/70716 700/113 |
| 7,198,141 | B2 * | 4/2007 | Kubo | F16C 32/0603 188/380 |
| 2002/0085192 | A1 * | 7/2002 | Miura | B82Y 10/00 355/73 |

* cited by examiner

WHEN FLOATING

DAMPING DEVICE FOR STRUCTURE

BACKGROUND

The present invention relates to a damping device for structure and particularly relates to the damping device for structure which is adapted to perform damping (or seismic isolation) on building, civil engineering and mechanical structures and so forth and functions as a vibration control device in such a manner that one damping device or a plurality of the damping devices is/are installed on a structure or on a floor surface thereof to prevent the structure from greatly shaking in a horizontal direction when vibrational external force generated from an earthquake, a typhoon, equipment and machinery and so forth is applied to the structure concerned from the outside.

Countermeasures have been taken so far against vibrations generated by forced vibration application to the structure and a resonance phenomenon occurring in the structure which are excited by vibration sources such as the typhoon, the earthquake, traffic and so forth by a damping device or a seismic isolation device (a TMD (Tuned Mass Damper) or a AMD (Active Mass Damper)), a seismic control brace and main body reinforcement using carbon fibers and so forth for insurance of safety and habitability of the structure.

However, in the above-described related art, there is an issue in performance due to influence of friction of the device. In addition, since response displacement is increased, the scale of a system configuration using the related art device is enlarged and also the price of the device is increased accordingly.

In addition, in the above-described related art, when targeting on inputting of vibrations such as a gale-induced vibration, an earthquake-induced vibration, a traffic-induced vibration, an ultra-long-period ground motion, a vortex-induced vibration and so forth, the structure undergoes large deformation and the issue occurs in safety and habitability of the structure.

Further, in the above-described related art, a structure which is little in attenuation and has a low dominant frequency is basically large in aspect ratio and therefore undergoes bending deformation and shear deformation when deformed.

In Japanese Laid-Open Patent Application No. 2011-202769, there is disclosed a floating-system seismic isolation device configured in such a manner that a superstructure whose lower surface is formed into a flat surface is placed on a base whose upper surface is formed into a flat surface so as to come the upper surface of the base and the low surface of the upper-side structure into surface contact with each other, a gap between contact faces of outer peripheral parts of the upper surface of the base and the lower surface of the superstructure which are in surface contest with each other is sealed with an outer peripheral sealing member so as to float the superstructure by introducing pressure gas into between the upper surface of the base and the lower surface of the superstructure when an earthquake occurs and an intermediate sealing member which partitions and seals an intermediate part between the contact faces of the upper surface of the base and the lower surface of the superstructure which are in surface contact with each other is mounted from the outer peripheral side of the superstructure.

However, the floating-system seismic isolation device disclosed in Japanese Laid-Open Patent Application No. 2011-202769 is of the type of adopting a construction that the pressure gas is introduced into between the upper surface of the base and the lower surface of the heavy superstructure thereby to float the superstructure. Therefore, also the scale of the device configuration is enlarged and also the device price is increased accordingly.

Patent Literature 1: Laid-Open Patent Application No. 2011-202769

SUMMARY

The present invention has been developed in view of the above-described circumstances of related art and aims to provide a damping device for structure which is able to achieve suppression of relative displacement and diversification of adjustment of a device natural period in generation of vibrations such as a ground motion and so forth and is able to achieve also reductions in size and price of the device.

A damping device for structure according to the present invention mainly includes a base frame which is installed on a target place, an air floating mass which is disposed on the base frame and blows off air, a damping mass which is disposed above the base frame and floats with a pressure of air sent from the air floating mass, one pair of guiderail units which are disposed on X-direction both sides of the base frame along the X direction respectively, a required number of slider units which are disposed to be slidable in the X direction relative to the one pair of guiderail units and are coupled to each X-direction side face of the damping mass and each of which includes a slider moving up/down mechanism part which moves down a slider when the damping mass floats, an attenuation mechanism which is attached to the base frame to be disposed in the X direction and exerts an attenuation action on the damping mass when the damping mass vibrates, and a restoration mechanism which is attached to the base frame to be disposed in the X direction and exerts a restoration action on the damping mass when the damping mass vibrates.

According to the present invention, the damping mass is configured to accurately float with air and to slidingly move by being guided by the guiderail units in generation of the vibration and thereby it becomes possible to make the damping mass execute a damping operation in a state where a sliding resistance is low and noise is also low in execution of the damping operation by the damping mass and while promoting rotation prevention. In addition, it becomes also possible to accurately exhibit the attenuation action by the attenuation mechanism and the restoration action by the restoration mechanism. Thereby, it becomes possible to achieve and provide a uniaxial (X-direction) damping type damping device for structure which is able to achieve the suppression of relative displacement and the diversification of adjustment of the device natural period in generation of the vibrations such as the ground motion and so forth and is able to achieve also the reductions in size and price of the device.

According to the present invention, a TMD mass is configured to accurately float with air and to slidingly move by being guided by guiderail units in generation of the vibration and thereby it becomes possible to make the TMD mass execute the damping operation in the state where the sliding resistance is low and noise is also low in execution of the damping operation by the TMD mass and while promoting the rotation prevention. In addition, it becomes possible to accurately exhibit the attenuation action by an oil damper and the restoration action by a coil spring. Thereby, it becomes possible to achieve and provide a uniaxial damping type damping device for structure which is able to achieve the suppression of relative displacement and the diversification of adjustment of the device natural period in generation of the vibrations such as the ground motion and so forth and is able to achieve also the reductions in size and price of the device.

According to the invention, a TMD mass is configured to slidingly move by being guided by guiderail units and thereby it becomes possible to accurately exhibit the attenuation action by an oil damper and the restoration action by a coil spring. Thereby, it becomes possible to achieve and provide a uniaxial damping type damping device for structure which is able to achieve the suppression of relative displacement and the diversification of adjustment of the device natural period in generation of the vibrations such as the ground motion and so forth and is able to achieve also the reductions in size and price of the device.

According to the present invention, a TMD mass is configured to slidingly move by being guided by guiderail units and thereby it becomes possible to accurately exhibit the attenuation action by an oil damper and the restoration action by a coil spring. Thereby, it becomes possible to achieve and provide a uniaxial damping type damping device for structure which is able to achieve the suppression of relative displacement and the diversification of adjustment of the device natural period in generation of the vibrations such as the ground motion and so forth and is able to achieve also the reductions in size and price of the device.

According to the invention defined in claim 1, a TMD mass is configured to accurately float with air and to slidingly move by being guided by a cross-guide body in two axial directions in generation of the vibration and thereby it becomes possible to make the TMD mass execute the damping operation in the state where the sliding resistance is low and the noise is also low in execution of the damping operation by the TMD mass and while promoting the rotation prevention. In addition, it becomes possible to accurately exhibit also the attenuation action by a slide bearing. Thereby, it becomes possible to achieve and provide a biaxial damping type damping device for structure which is able to achieve the suppression of relative displacement and the diversification of adjustment of the device natural period in generation of the vibrations such as the ground motion and so forth and is able to achieve also the reductions in size and price of the device.

According to the invention defined in claims 1 to 2, elastic shock absorbing tools which are made of rubber materials and so forth which are fixedly disposed in a state of respectively confronting Y-direction side faces of the TMD mass are included. Thereby, it becomes possible to achieve and provide the damping type damping device for structure which is able to suppress an excessive vibration of the TMD mass and to increase the safety of the device itself.

According to the invention defined in claims 1 and 3, an air leakage prevention mechanism unit which is disposed over the entire of the inner side of a lower-surface outer peripheral part of the TMD mass and prevents air leakage to the outside through the lower surface of the TMD mass when the TMD mass floats is included. Thereby, it becomes possible to achieve and provide the damping type damping device for structure which makes it possible for the TMD mass to float with air and to execute the damping operation in a stable state in generation of the vibration.

DETAILED DESCRIPTION

The present invention achieves an aim to provide a damping device for structure which is able to achieve suppression of relative displacement and diversification of adjustment of a device natural period in generation of vibrations such as a ground motion and so forth and is able to achieve also reductions in size and price of the device by a configuration which includes a base frame which is installed on a target place, an air floating mass which is disposed on the base frame and blows off air, a TMD mass which is disposed above the base frame and floats with a pressure of air sent from the air floating mass, one pair of guiderail units which are disposed on X-direction both sides of the base frame along the X direction respectively, a required number of slider units which are disposed to be slidable in the X direction relative to the one pair of guiderail units and are coupled to each X-direction side face of the TMD mass and each of which includes a slider moving up/down mechanism part which moves down a slider when the TMD mass floats, an oil damper which is attached to the base frame to be disposed in the X direction and exerts an attenuation action on the TMD mass when the TMD mass vibrates and a coil spring which is attached to the base frame to be disposed in the X direction and exerts a restoration action on the TMD mass when the TMD mass vibrates.

EMBODIMENTS

In the following, damping devices for structures according to preferred embodiments of the present invention will be described in detail with reference to the drawings.

First Embodiment

A damping device for structure 1 according to the first embodiment of the present invention is a floating-type damping device which is configured to perform damping in one axial direction (an X direction).

Figure 1:
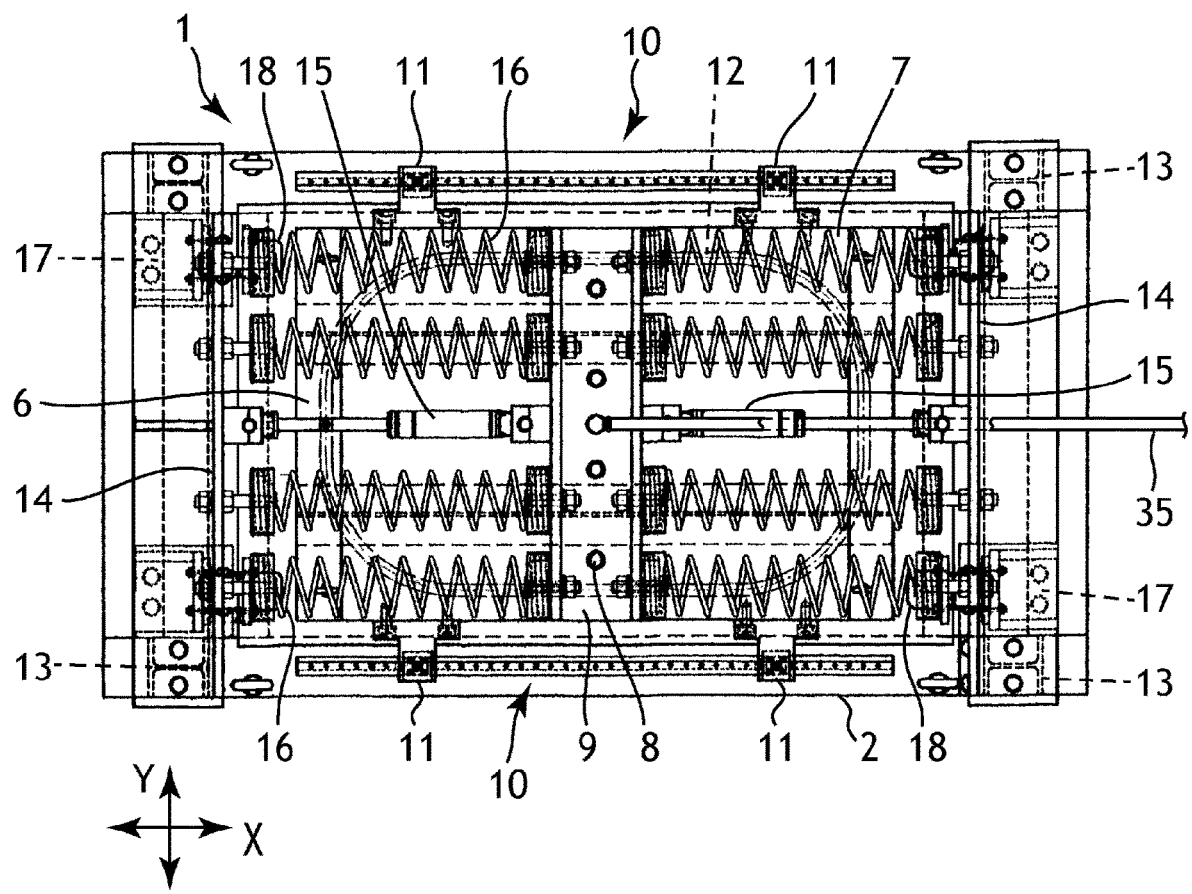
FIG. 1 is a schematic plan view illustrating one example of a damping device for structure according to a first embodiment of the present invention.
Figure 2:
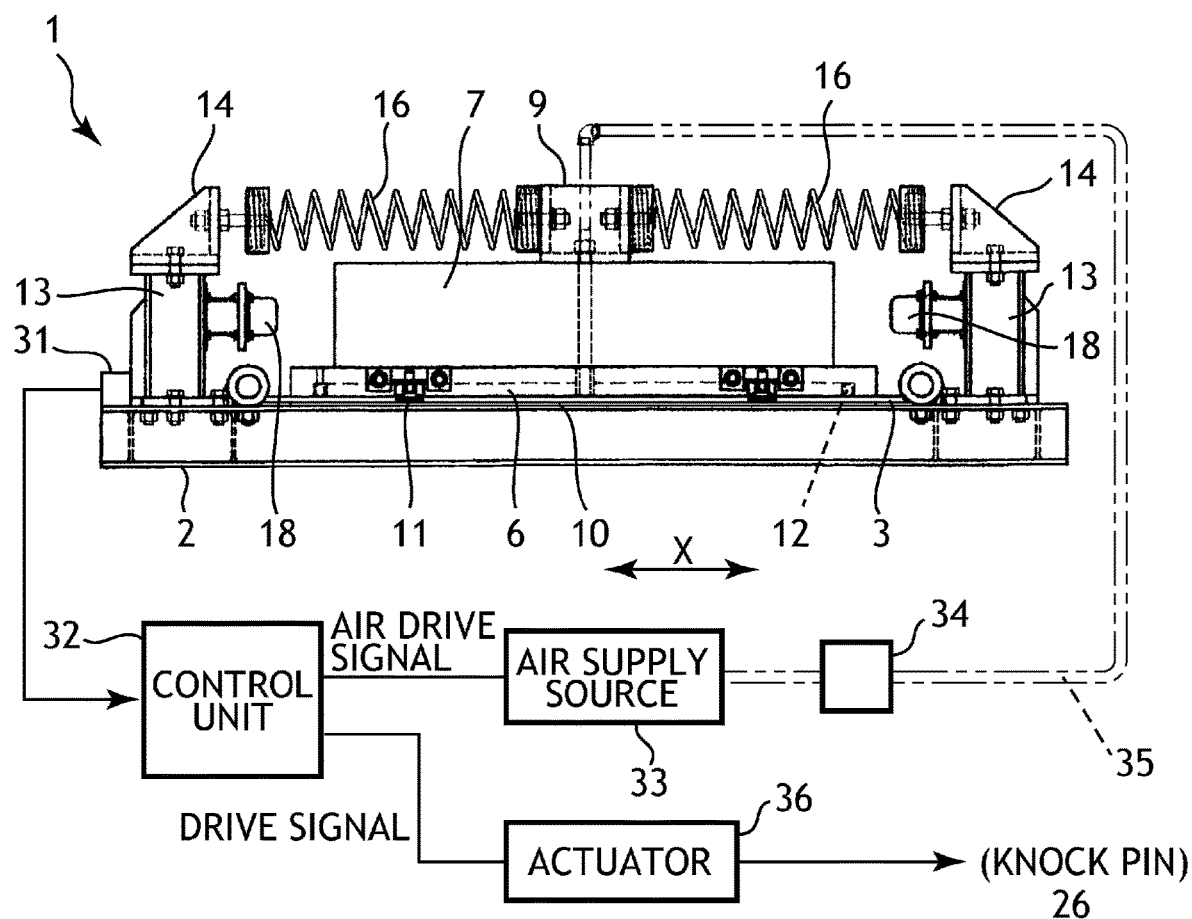
FIG. 2 is a schematic front view illustrating one example of the damping device for structure according to the first embodiment of the present invention.
Figure 3:
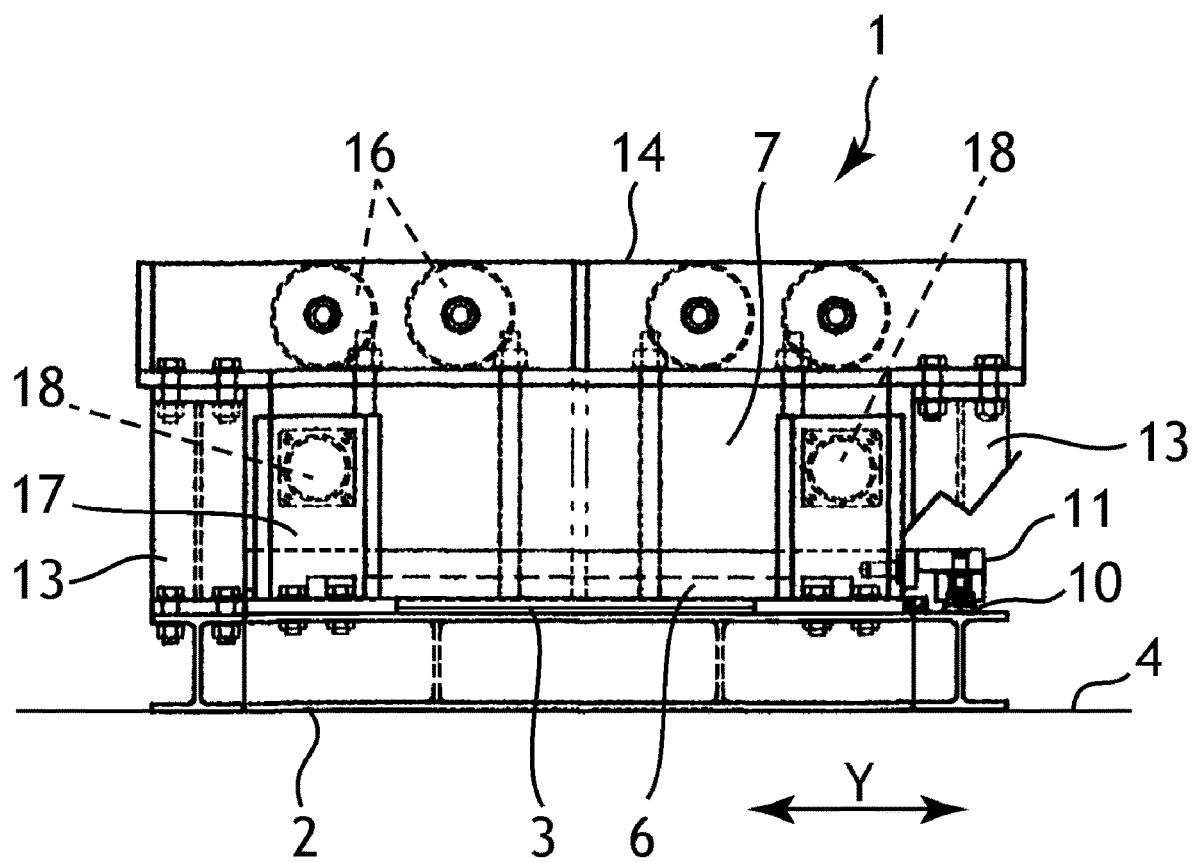
FIG. 3 is a partially cut-out schematic side view illustrating one example of a cross section of part of the damping device for structure according to the first embodiment of the present invention.

That is, as illustrated in FIG. 1 to FIG. 3, the damping device for structure 1 according to the first embodiment of the present invention includes a base frame 2 which is installed on a structure concerned or on a floor face 4 and has a rectangular shape in a planar view (alternatively, may have a square shape in the planar view), an installation base material 3 which is fixedly disposed on the base frame 2 and is configured by a two-layer construction of a steel plate and a resin plate, an air floating mass 6 which is disposed on the installation base material 3 and blows off air so as to make a TMD mass 7 which will be described later float with the air, the TMD mass 7 which serves as a damping mass which is disposed above the installation base material 3, has a rectangular parallelepiped shape and is large in weight, a central coupling tool 9 which is fixed to the TMD mass 7 with stud bolts 8 and is additionally attached along a Y direction in a U-shape, one pair of guiderail units 10, 10 which are fixedly disposed on X-direction both sides of the base frame 2 one by one along the X direction respectively, a required number of slider units 11 which are disposed to be slidable in the X direction relative to the one pair of guiderail units 10, 10 and are coupled to each X-direction side face of the air floating mass 6 and each of which includes a slider moving up/down mechanism part 11A, an air leakage prevention mechanism unit 12 which is disposed over the entire of the inner side of a lower-surface outer peripheral part of the air floating mass 6, corner support column units 13 which are four in total and are disposed on respective corners of the base frame 2 to be facingly disposed two by two on each side, one pair of attaching tools 14 which are installed between the corner support column units 13 which are disposed two by two on each side to be disposed in the Y direction respectively, one pair of oil dampers 15 which serve as attenuation mechanisms which are attached between one attaching tool 14 in the one pair of attaching tools 14 and one Y-direction piece of the central coupling tool 9 and between the other attaching tool 14 in the one pair of attaching tools 14 and the other Y-direction piece of the central coupling tool 9 to be disposed in the X direction respectively at a Y-direction central position of the device 1, coil springs 16 which are eight in total and serve as restoration mechanisms which are coupled between the one attaching tool 14 and one Y-direction piece of the central coupling tool 9 and between the other attaching tool 14 and the other Y-direction piece of the central coupling tool 9 and at positions on the both Y-direction outer sides of one pair of oil dampers 15 to be disposed in the X direction respectively, elastic shock absorbing tool attachment support columns 17 which are four in total and are respectively disposed on the base frame 2 at positions which are closer to the Y-direction center than the positions of the four corner support column units 13 and elastic shock absorbing tools 18 which are four in total and are made of rubber materials and so forth which are attached to the respective elastic shock absorbing tool attachment support columns 17 respectively and are facingly disposed two by two on each side in a state of respectively confronting Y-direction side faces of the TMD mass 7 thereby to suppress an excessive vibration of the TMD mass 7 and to increase safety of the TMD mass 7.

Next, the guide rail unit 10 and the slider unit 11 which includes the slider moving-up/down mechanism part 11A will be described with reference to FIG. 1, FIG. 2 and FIG. 4.

Figure 4:
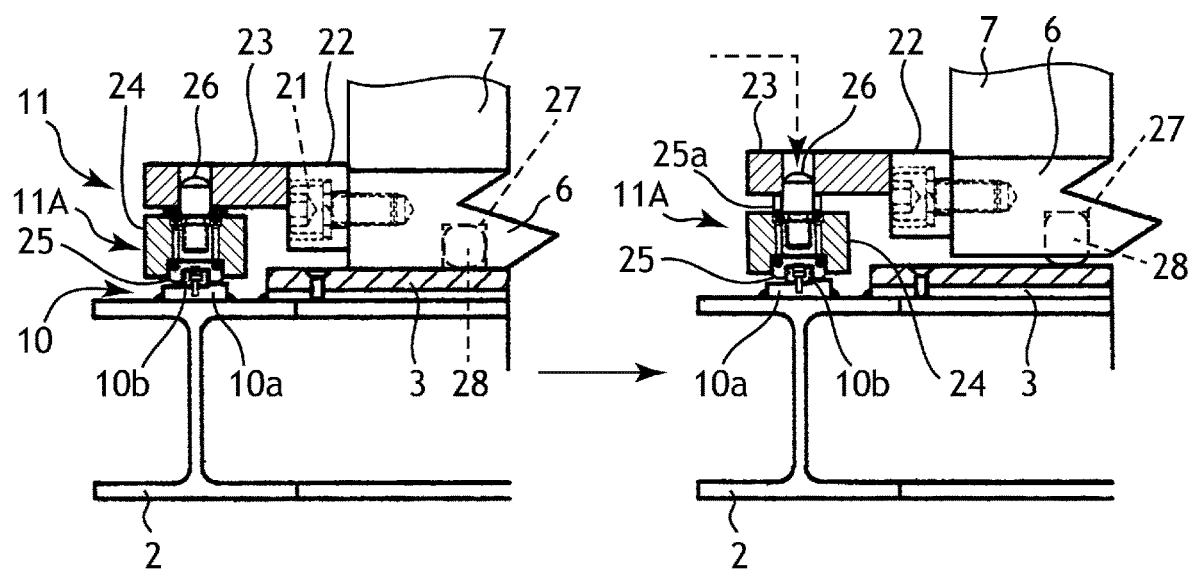
FIG. 4 is an explanatory diagram illustrating one example of constructions and operations of a guiderail unit and a slider unit in the damping device for structure according to the first embodiment of the present invention.

As illustrated in FIG. 4, the guiderail unit 10 is configured by fixing rail bases 10a to X-direction both sides of the base frame 2 by welding along the X direction respectively and disposing a guiderail 10b on upper surfaces of the rail bases 10a in the X direction.

As illustrated in FIG. 1, FIG. 2 and FIG. 4, the slider unit 11 which includes the slider moving-up/down mechanism part 11A includes a coupling piece 23 which is supported by one pair of fixing plates 22, 22 which are attached to an X-direction side face of the air floating mass 6 with bolts 21. A slider holder 24 is disposed under the coupling piece 23 and a slider 25 which is brought into sliding contact with the guiderail 10b is fixed to a lower surface of the slider holder 24 by welding.

In addition, the guiderail unit 10 and the slider unit 11 are configured in such a manner that a disc spring 25a is interposed between a lower surface of the coupling piece 23 and an upper surface of the slider holder 24, a knock pin 26 is disposed ranging from an inner part of the coupling piece 23 to an inner part of the slider holder 24 to be disposed concentrically with the disc spring 25a and thereby positional control is conducted in such a manner that in a normal state (for example, a state where no seismic motion occurs) illustrated on the left column in FIG. 4, the slider holder 24 is located at a position where an upper surface of the slider holder 24 comes near the lower surface of the coupling piece 23 while maintaining the disc spring 25a in a compressed state thereby to bring the slider 25 into sliding contact with the guiderail 10b.

Further, the guiderail unit 20 and the slider unit 11 are configured in such a manner that in damping (for example, a state where a seismic motion occurs and the TMD mass 7 is made to float upward), the knock pin 26 is operated to release the positional control on the disc spring 25a, to move the slider holder 24 and the slider 25 downward by a predetermined dimension with the aid of elastic force of the disc spring 25a and thereby to bring the slider 25 into sliding contact with the guiderail 10b as illustrated on the right column in FIG. 4.

That is, the slider moving up/down mechanism part 11A is configured by the slider holder 24, the disc spring 25a and the knock pin 26 thereby to configure to make it possible to accurately execute an X-direction damping operation by the TMD mass 7 which enters a floating state in damping.

Next, the air leakage prevention mechanism unit 12 will be described with reference to FIG. 5.

Figure 5:
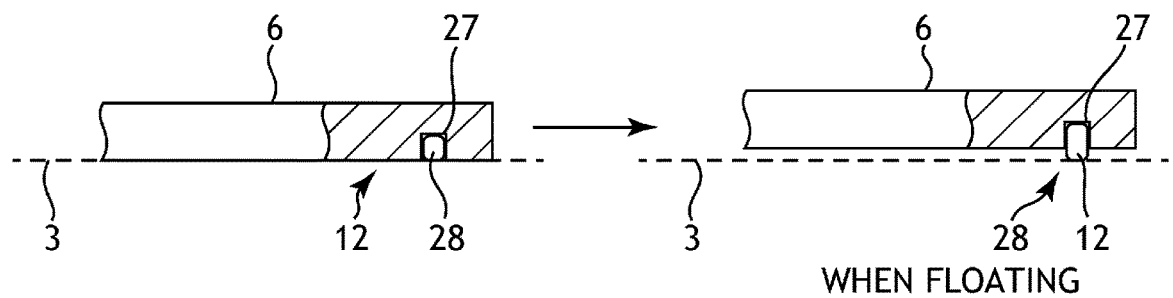
FIG. 5 is an explanatory diagram illustrating one example of an operation of an air leakage prevention mechanism unit in the damping device for structure according to the first embodiment of the present invention.

As illustrated in FIG. 5, the air leakage prevention mechanism unit 12 includes a concave groove part 27 which is formed over the entire of the inner side of a lower-surface outer peripheral part of the air floating mass 6 and an elastic auto-bulging tube 28 which is embedded in the entire of the concave groove part 27 and is made of, for example, a rubber material, an elastic synthetic resin material and so forth.

Then, the air leakage prevention mechanism unit 12 is configured in such a manner that in the normal state (for example, in the case where no seismic motion occurs), the auto-bulging tube 28 is housed in the concave groove part 27 of the air floating mass 6 in a crushed state as illustrated on the left column in FIG. 5 and in damping (for example, the state where the seismic motion occurs and the TMD mask 7 is made to float upward), the entire of a lower part of the auto-bulging tube 28 housed in the concave groove part 27 is made to automatically bulge out to bring the lower end side of the auto-bulging tube 28 into cross contact with the installation base material 3 to prevent air leakage to the outside through the lower part of the air floating mass 6 and thereby to accurately perform a floating operation of the TMD mass 7 as illustrate on the right column in FIG. 5.

Next, an air supply system for the air floating mass 6 and a drive system for the knock pin 26 will be described with reference to FIG. 2 and FIG. 4.

The damping structure for structure 1 according to the first embodiment includes a vibration sensor 31 which detects vibrations such as the seismic motion and so forth, a control unit 32 which generates an air drive signal for the air floating mass 6 and a drive signal for the knock pin 26 on the basis of a detection signal from the vibration sensor 31, an air supply source 33, a flow rate control valve 34 and an air supply pipeline 35 which configure the air supply system for the air floating mass 6 and an actuator 36 which operates the knock pin 26 on the basis of the drive signal for the knock pin 26, in addition to the above-described constitutional elements.

Then, the damping device for structure 1 is configured in such a manner that the air supply source 33 is operated on the basis of the air drive signal to feed predetermined pressure air to the air floating mass 6 via the flow rate control valve 34 and the air supply pipeline 35, to blow off the air to the lower surface of the air floating mass 6 and thereby to float the air floating mass 6 and the TMD mass 7 and the knock pin 26 is operated on the basis of the drive signal to release the positional control on the disc spring 25*a* by the knock pin 26.

The damping device for structure 1 according to the first embodiment is a vibration control (seismic isolation, damping (seismic control)) device for the building, civil engineering and mechanical structures and so forth which is adapted to prevent the structure concerned from greatly shaking in a horizontal direction when vibrational external force which is generated from an earthquake, a typhoon, equipment and machinery and so forth is applied to the structure concerned from the outside by installing one system or a plurality of systems using the damping device for structure 1 on the structure concerned or on the floor surface and is adapted to reduce relative displacement and an absolute acceleration of the structure concerned in order to ensure safety and habitability of the structure.

In the damping device for structure 1 according to the first embodiment, the TMD mass 7 whose mass is optionally set is constructed to float with air sent from the air floating mass 6 to be movable (actively and passively) in one horizontal direction (the X direction). In addition, the damping device for structure 1 also includes the guiderail unit 10 which has a rotation prevention function and a load support function, the coil spring 16 which configures a restoring force application mechanism, the oil damper 15 which configures an attenuation mechanism and so forth.

Incidentally, use of the damping device for structure 1 together with a friction plate and so forth is also possible for special uses.

In the damping device for structure 1 according to the first embodiment, it is also possible to configure the restoring force application mechanism by a leaf spring, laminated rubber and so forth having a period adjustment function, in addition to the coil spring 16.

In addition, it is also possible to configure the attenuation mechanism by attenuation mechanisms of an elastoplastic system, a friction system and so forth, in addition to the oil damper 15 of a viscous system.

In the damping device for structure 1 according to the first embodiment, the air supply source 33 is configured in such a manner that an air compressor is installed near the damping device for structure 1 and it is made possible to freely set an air pressure and a floating height by the flow rate control valve 34 and so forth.

In the following, the damping device for structure 1 according to the first embodiment will be described in more detail.

The damping device for structure 1 according to the first embodiment includes the air leakage prevention mechanism unit 12 to prevent air leakage to the outside through the lower part of the air floating mass 6 when the air floating mass 6 floats and thereby to upgrade a floating function of the air floating mass 6.

Selection is possible among a method of making use of air, a mechanical sealing method and so forth as a sealing method for prevention of air leakage around the air floating mass 6 and there are various options depending on the use application of a structure to be controlled and so forth.

In addition, the air floating mass 6 is generally placed on the floor and includes triggers such as the vibration sensor 31, the control unit 32 and so forth used for floating when an external vibration is input and a trigger level in this case is made to be freely settable.

Next, for example, the guiderail unit 10 which is used together with the TMD mass 7 also has the function of preventing rotation of the TMD mass 7 in addition to the function of supporting a load which is about 0% to 30% of the entire mass of the TMD mass 7.

Further, for example, improvement of workability, a reduction in amplitude and a reduction in price of the system are achieved by using a friction plate together with the damping device for structure 1.

In the damping device for structure 1 according to the first embodiment, although the number and the kind of spring elements used are freely selectable depending on the use application of the damping device for structure 1 and it is possible to use one (kind of) spring element and/or the plurality of (kinds of) the spring elements in a combined state as the restoration mechanism, it is possible to select specifications of the magnitude of a deformation volume, a spring constant and so forth in a variety of ways.

The attenuation mechanism is configured in such a manner that the number and the kind thereof are freely selectable depending on the use application of the damping device for structure 1 and, mainly in a viscous damper, a viscoelastic damper and the elastoplastic damper, one (kind of) damper is used and/or the plurality of (kinds of) dampers are used in the combined state.

In the damping device for structure 1 according to the first embodiment, it is necessary for the guiderail unit 10 which supports some mass of the TMD mass 7 to be used together with a mechanism which is able to freely move the TMD mass 7 in an up-down direction when the TMD mass 7 floats and the slider moving up/down mechanism 11A is adopted in the first embodiment for this reason.

The guiderail unit 10 exhibits a function of making it possible to support the total mass of the TMD mass 7 in a case where a trouble occurs in the air floating mass 6 as a rare possibility when the TMD mass 7 floats with air.

In further summary, in the damping device for structure 1 according to the first embodiment, since the TMD mass 7 is configured as the floating-system mass, a sliding resistance in execution of the damping operation is small and therefore it becomes possible to reduce the vibration in response to a small input from the outside.

In the damping device for structure 1 so configured, optimum attenuation force is applied in order to ensure performance of each piece of control equipment. For this purpose, the basic attenuation force which is small makes adjustment easy and therefore the point that the sliding resistance is small becomes a major advantage. At the same time, the damping device for structure 1 also has such an advantage that abrasion and generation of heat are reduced.

In the damping device for structure 1 according to the first embodiment, the noise generated in execution of the damping operation is reduced by configuring the TMD mass 7 as the floating-system mass.

The rotation prevention function and vibration control performance become important factors from the viewpoints of suppression of the vibration displacement of the TMD mass 7 and deformation suppression and safety of a piping system. In this respect, in the damping device for structure 1 according to the first embodiment, it becomes possible to exhibit the rotation prevention function and the vibration control performance by the guiderail unit 10.

Further, the damping device for structure 1 according to the first embodiment is manufactured by using the optimum restoring force application mechanism and attenuation mechanism and therefore period adjustment is easy and adjustment of the restoring force is also easy.

As described above, according to the damping device for structure 1 according to the first embodiment, it becomes possible to achieve the suppression of relative displacement and the diversification of adjustment of the device natural period in generation of the vibrations such as the seismic motion and so forth and to reduce the relative displacement and the absolute acceleration of the structure in order to ensure the safety and the habitability of the structure and further the reductions in size and price of the damping device for structure 1 itself become also possible.

In addition to the above, also activation of the damping device for structure 1 becomes possible by being equipped with a control panel (for example, the control unit 32), a vibration sensor (for example, the vibration sensor 31), a driving device (for example, the actuator 36) and so forth.

The damping device for structure 1 according to the first embodiment is highly useful in the points of maintenance and insurance of the safety, the habitability and so forth mainly against the external vibrations such as, for example, vibrations including the long-period ground motion which are generated when an earthquake occurs, when a gale blows in a typhoon and so forth and when resonance occurs by being induced by a vortex-induced vibration which are natural external force and further a traffic-induced vibration, a construction-induced vibration, equipment/machinery-induced vibrations and so forth which are environmental vibrations.

Second Embodiment

Next, a damping device for structure 1A according to the second embodiment of the present invention will be described with reference to FIG. 6 to FIG. 9.

Figure 6:
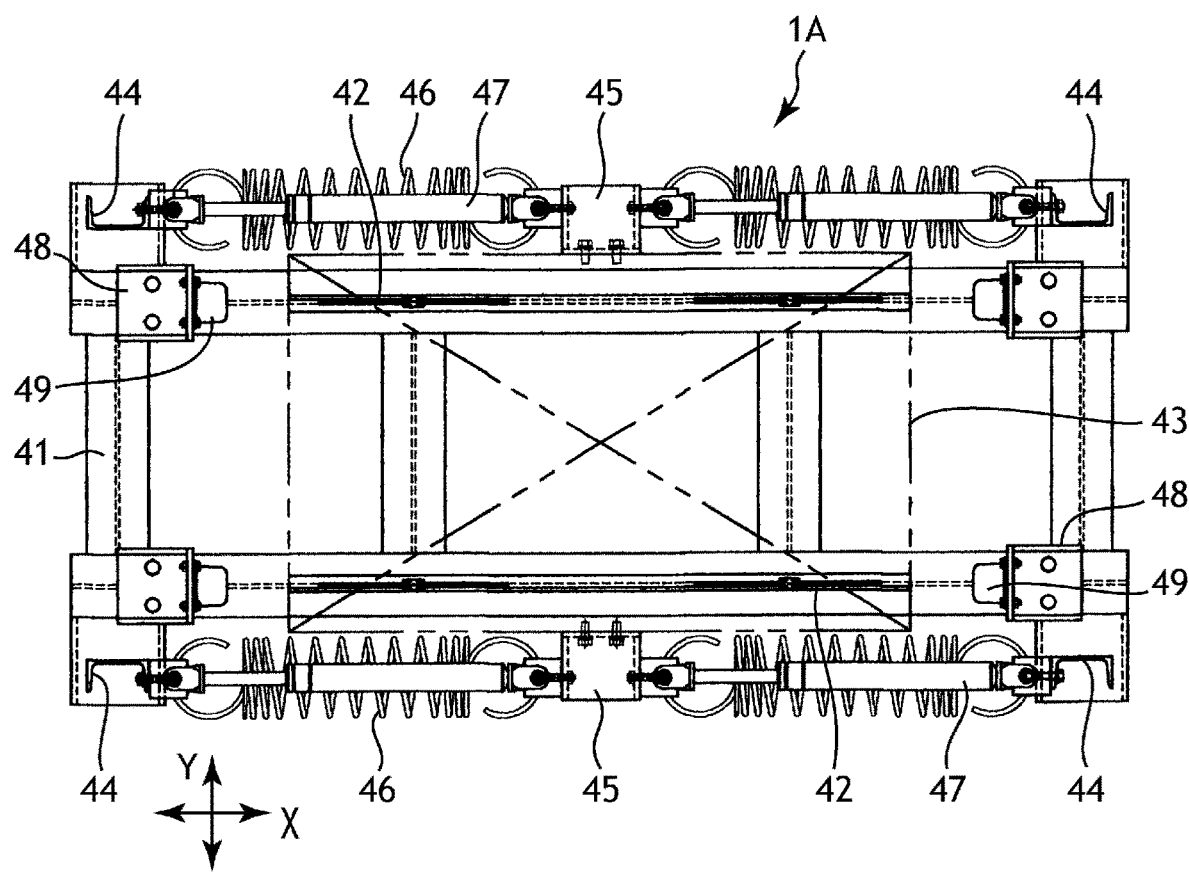
FIG. 6 is a schematic plan view illustrating one example of a damping device for structure according to a second embodiment of the present invention.
Figure 7:
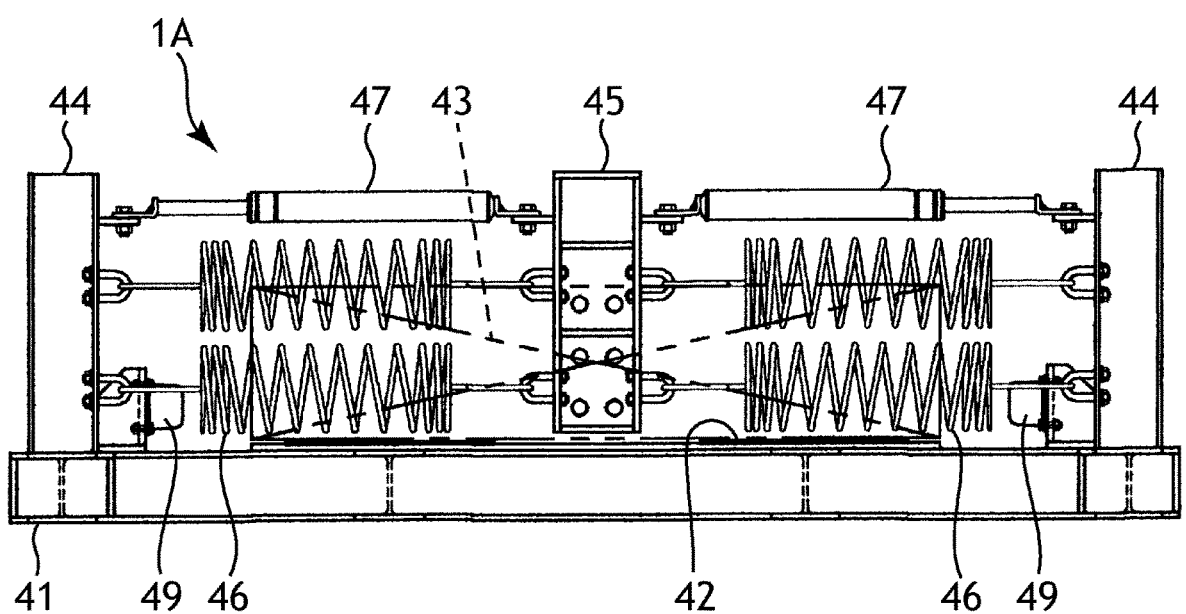
FIG. 7 is a schematic front view illustrating one example of the damping device for structure according to the second embodiment of the present invention.
Figure 8:
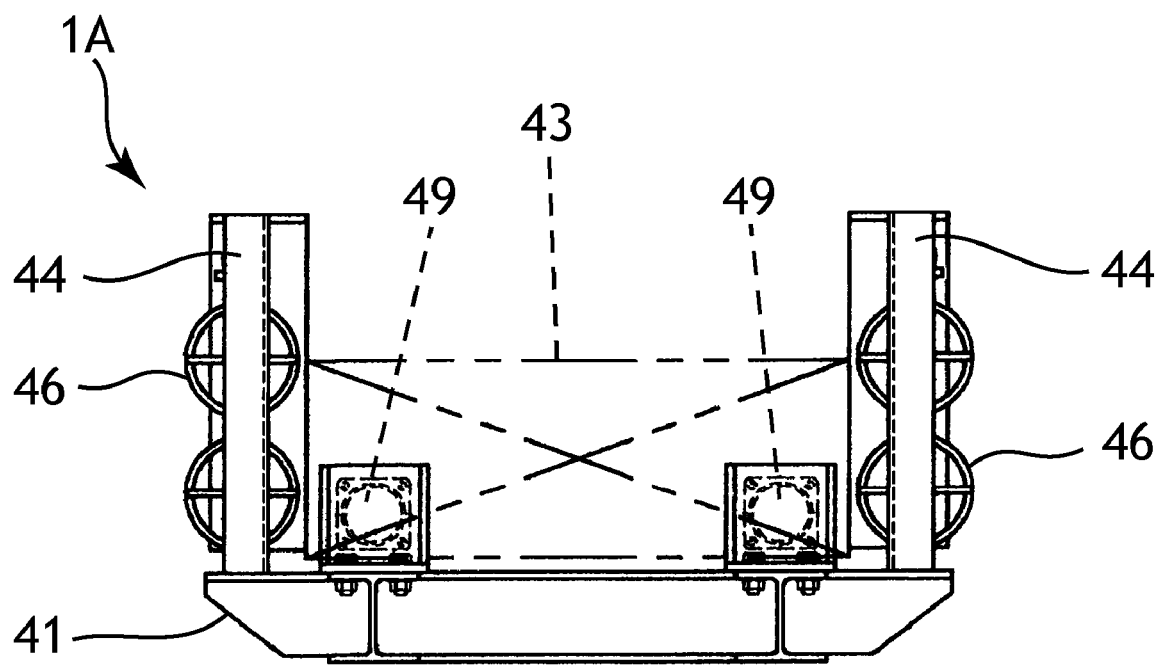
FIG. 8 is a schematic side view illustrating one example of the damping device for structure according to the second embodiment of the present invention.

The damping device for structure 1A according to the second embodiment is configured to perform damping in one axial direction (the X direction) by a rail system and includes, as illustrated in FIG. 6 to FIG. 8, a base frame 41 which is installed on a structure concerned or on a floor surface concerned and is framed to exhibit a rectangular shape in a planar view, one pair of guiderail units 42, 42 which are disposed on the base frame 41 in parallel with each other in the X direction and at a predetermined interval, a rectangular parallelepiped and heavy TMD mass 43 which is installed above the one pair of guiderail units 42, 42, support columns 44 which are four in total and are disposed to stand upright from four corners of the base frame 41 respectively, one pair of vertical framework columns 45, 45 which are bolted onto the base frame 41 respectively at positions which are located on the Y-direction outer side of the TMD mass 43 and correspond to central parts of both X-direction long sides of the TMD mass 43, coil springs 46 which are four in total and are attached between one support column 44 on the side of one long-side in the four support columns 44 and one vertical side of the vertical framework support column 45 on the side of one long-side in the one pair of vertical framework columns 45, 45 and between the other support column 44 on the side of one long-side in the four support columns 44 and the other vertical side of the vertical framework column 45 on the side of one long-side in the one pair of vertical framework columns 45, 45 at middle-stage positions and lower-stage positions of the columns 44 and 45, two oil dampers 47 which are attached to upper-stage positions of the columns 44 and 45, the coil springs 46 which are four in total and the two oil dampers 47 both of which are attached between the two support columns 44 on the side of the other long-side in the four support columns 44 and the vertical framework column 45 on the side of the other long-side in the one pair of vertical framework columns 45, 45 similarly to the above case and, elastic shock absorbing tool attachment tools 48 which are four in total and are disposed at Y-direction positions on inner sides of the four support columns 44, elastic shock absorbing tools 49 which are four in total and are made of rubber materials and so forth which are attached to the respective elastic shock absorbing tool attachment tools 48 respectively and are facingly disposed two by two on each side in a state of confronting Y-direction side faces of the TMD mass 43 respectively.

Figure 9:
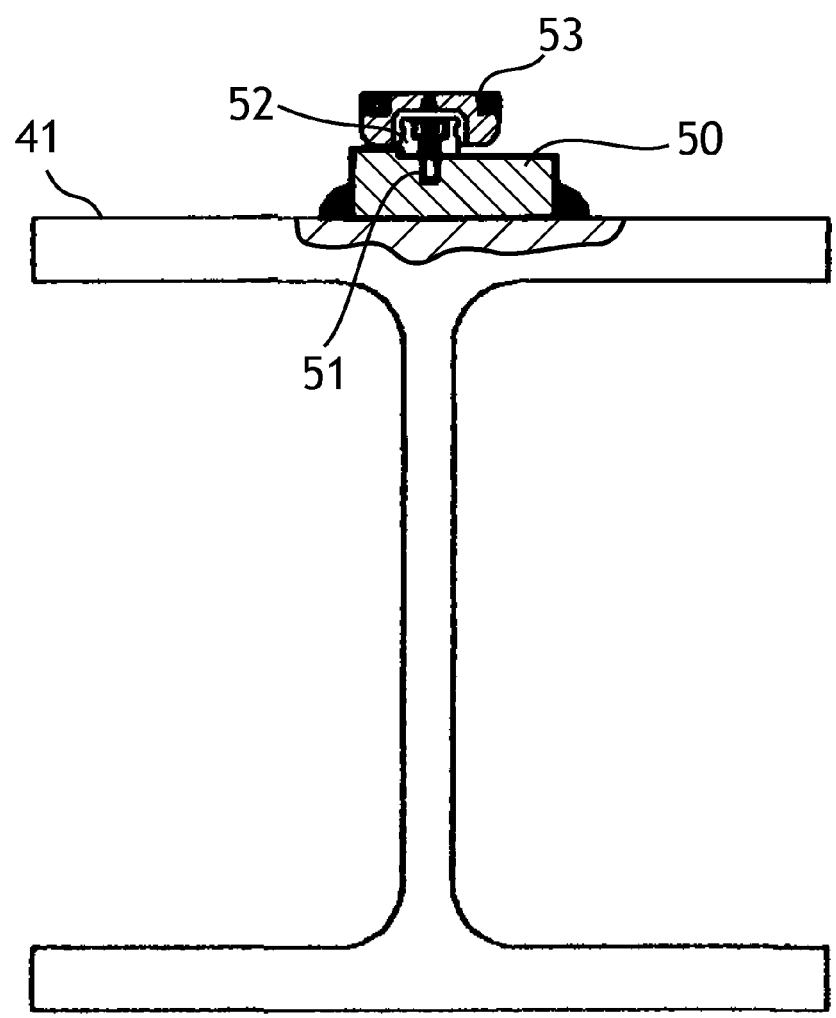
FIG. 9 is a schematic construction diagram illustrating one example of a guiderail unit in the damping device for structure according to the second embodiment of the present invention.

As illustrated in FIG. 9, the guiderail unit 42 has a configuration which is similar to a well-known linear guide by including a long rail base 50 which is fixed onto the base frame 41 by welding, a rail body 52 which is disposed on the rail base 50 in the same direction as that of the rail base 50 and is bolted onto the rail base 50 with a cap bolt 51 and a slide body 53 which is additionally attached to a lower surface of the TMD mass 43 and slides on the rail body 52.

According to the uniaxial damping type damping device for structure 1A according to the second embodiment, the TMD mass 43 is configured to slidingly move by being guided by the guiderail unit 42. Thereby, it becomes possible to accurately exhibit an attenuation action by the oil damper 47 and a restoration action by the coil spring 46, to achieve the suppression of relative displacement and the diversification of adjustment of the device natural period in generation of the vibrations such as the seismic motion and so forth and to achieve also the reductions in size and price of the damping device for structure 1A.

Third Embodiment

Next, a damping device for structure 1B according to the third embodiment of the present invention will be described with reference to FIG. 10.

Figure 10:
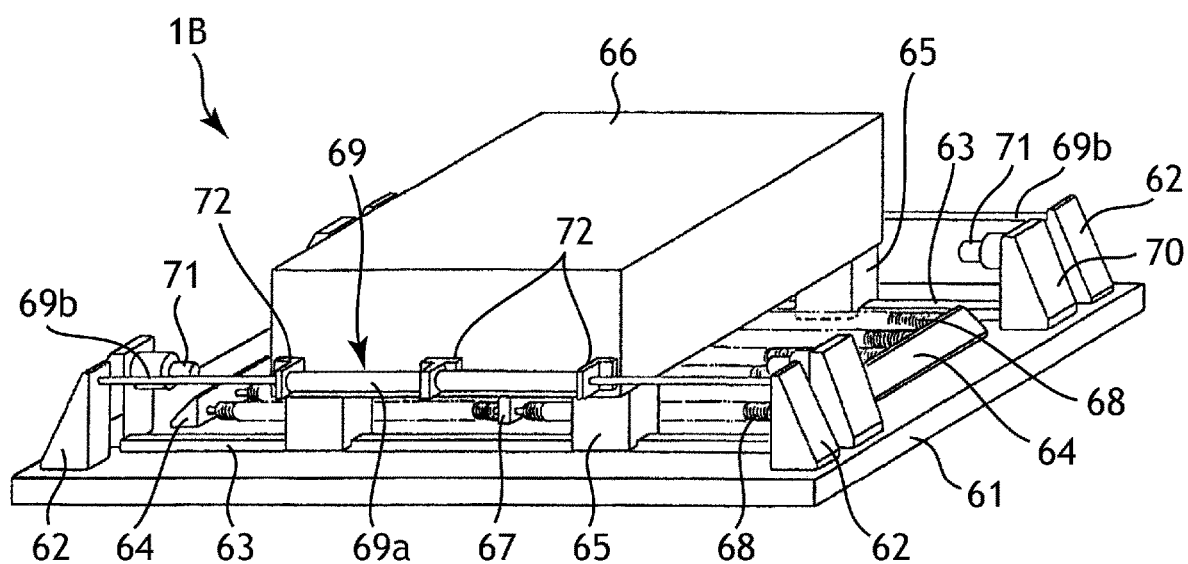
FIG. 10 is a schematic perspective view illustrating one example of a damping device for structure according to a third embodiment of the present invention.

The damping device for structure 1B according to the third embodiment is configured to perform one axial direction (the X direction) damping by the rail system and includes, as illustrated in FIG. 10, a base frame 61 which is installed on a structure concerned or on a floor surface concerned and exhibits a rectangular shape in the planar view, four cylinder rod attachment bodies 62 which are disposed on the base frame 61 and on four corners of the base frame 61, one pair of guiderail units 63, 63 which are disposed on the base frame 61 in parallel with each other in the X direction and at a predetermined interval, one pair of coil spring attachment bodies 64, 64 which are disposed on the base frame 61 in parallel with each other in the Y direction and at a predetermined interval at positions which are more inward that those of the one pair of guiderail units 63, 63, a rectangular parallelepiped and heavy TMD mass 66 which is disposed above the one pair of guiderail units 63, 63 and in which a required number of slide bodies 65 which are fixed to four corners of a lower surface of the TMD mass 66 are brought into sliding contact with the one pair of guiderail units 63, 63 respectively to be slidable, a square-bar-shaped coil spring intermediate attachment body 67 which is attached to an X-direction lower-surface central part of the TMD mass 66 in the Y direction, coil springs 68 which are twenty in total (six columns, disposed on both sides of the coil spring intermediate attachment body 67 six by six) which are attached between one coil spring attachment body 64 in the one pair of coil spring attachment bodies 64, 64 and one Y-direction side face of the coil spring intermediate attachment body 67 and between the other coil spring attachment body 64 in the one pair of coil spring attachment bodies 64, 64 and the Y-direction other side face of the coil spring intermediate attachment body 67, two oil dampers (only one damper is illustrated in FIG. 10) 69 in each of which a cylinder part 69a is attached to an X-direction side face of the TMD mass 66 by using, for example, three attaching tools 72 and respective cylinder rods 69b which project from the cylinder part 69a toward X-direction both sides are attached to and supported by the respective cylinder rod attachment bodies 62 respectively, elastic shock absorbing tool attaching tools 70 which are four in total and are disposed on the base frame 61 at positions on the Y-direction inner sides of the cylinder rod attachment bodies 62 respectively and elastic shock absorbing tools 71 which are four in total and are made of rubber materials and so forth which are attached to the respective elastic shock absorbing tool attaching tools 70 respectively and are facingly disposed two by two on each side in a state of confronting Y-direction side faces of the TMD mass 66 respectively.

According to the uniaxial damping type damping device for structure 1B according to the third embodiment, the TMD mass 66 is configured to slidingly move by being guided by the guiderail unit 63 and thereby it becomes possible to accurately exhibit the attenuation action by the oil damper 69 and the restoration action by the coil spring 68. Thereby, it becomes possible to achieve the uniaxial damping type damping device for structure 1B which is able to achieve the suppression of restriction on relative displacement and the diversification of adjustment of the device natural period in generation of the vibrations such as the seismic motion and so forth and is able to achieve also the reductions in size and price of the damping device for structure 1B.

Fourth Embodiment

Next, a damping device for structure 1C according to the fourth embodiment of the present invention will be described with reference to FIG. 11 to FIG. 13.

Figure 11:
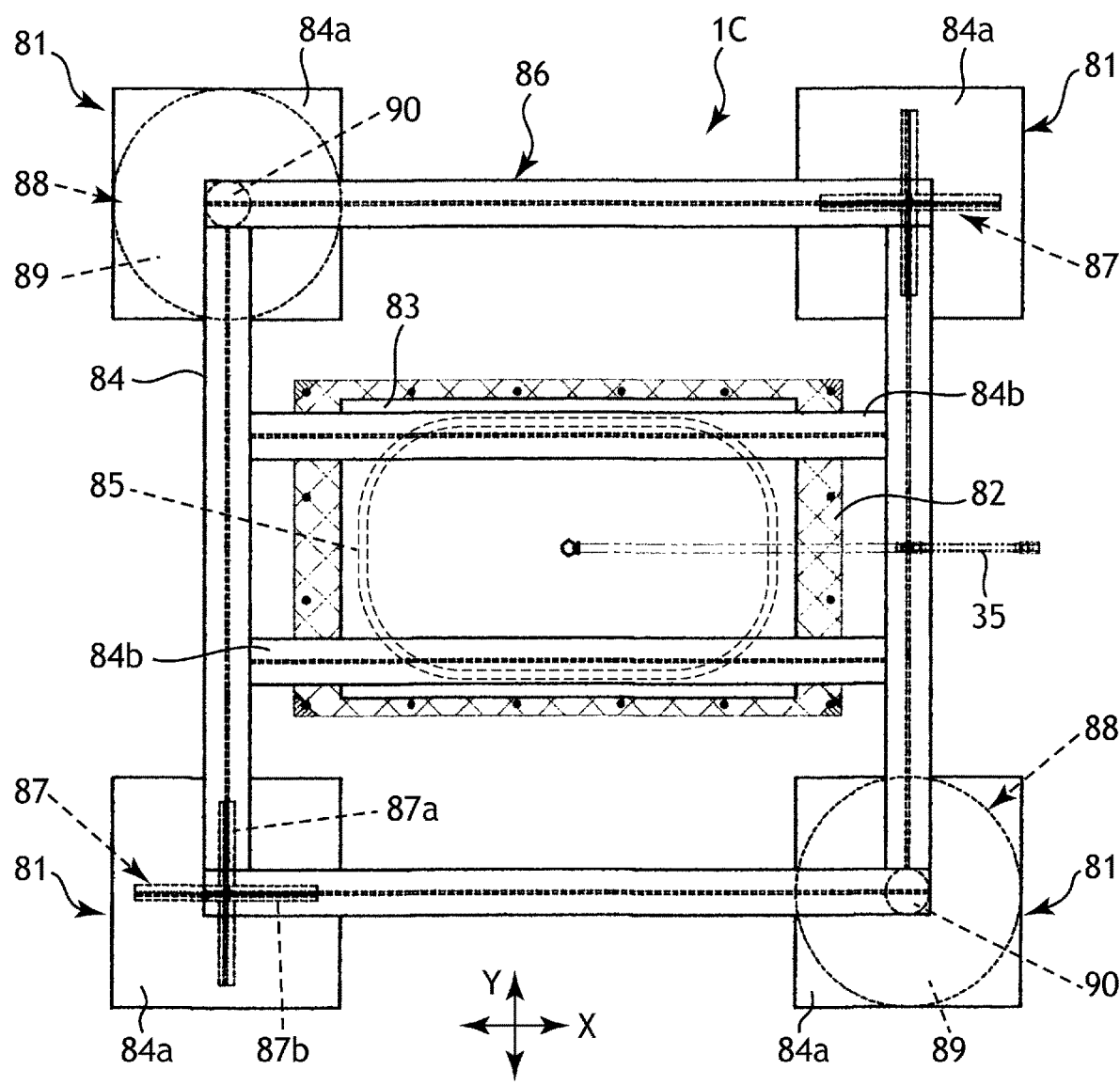
FIG. 11 is a schematic plan view illustrating one example of a damping device for structure according to a fourth embodiment of the present invention.
Figure 12:
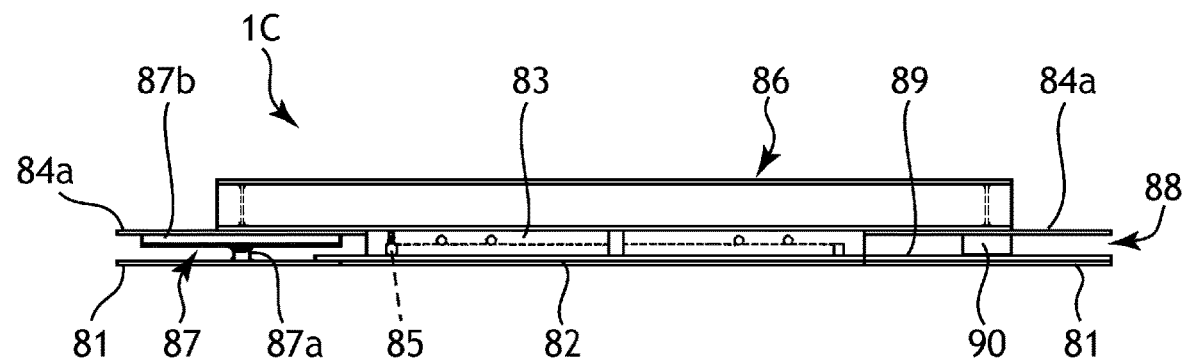
FIG. 12 is a schematic front view illustrating one example of the damping device for structure according to the fourth embodiment.
Figure 13:
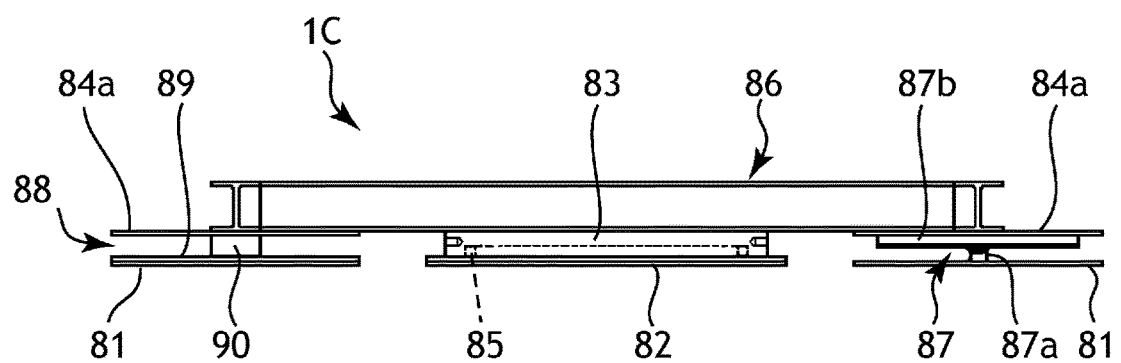
FIG. 13 is a schematic side view illustrating one example of the damping device for structure according to the fourth embodiment of the present invention.

The damping device for structure 1C according to the fourth embodiment is a floating-system device which is configured to perform damping in two axial directions (the X direction and the Y direction) similarly to the damping device for structure 1 according to the first embodiment and includes, as illustrated in FIG. 11 to FIG. 13, four installation bases 81 which are installed on a structure concerned or on a floor surface concerned to be arranged into a square-shape in the planar view and each of which is configured by a steel plate, a synthetic resin plate or a two-layer construction of the steel plate and the synthetic resin plate and an air floating mass placing table 82 which is installed on the structure or the floor surface at a central part of a region surrounded by the four installation bases 81 and has a two-layer construction configured by the steel plate and the synthetic resin plate and also includes an air floating mass 83 which is configured similarly to the air floating mass 6 according to the first embodiment, a square-frame-shaped TMD mass 86 which is disposed above the four installation bases 81 in an arrangement that four corners positionally match respective central parts of the four installation bases 81 and in which an H-shaped frame material (an H-shaped steel material) 84 is framed into a square shape and the air floating mass 83 is disposed on lower surfaces of one pair of intermediate frames 84b, two well-known cross-guide bodies 87, 87 which are installed on one set of two diagonally arranged installation bases 81, 81 in the four installation bases 81 and whose upper parts are coupled to lower surfaces of one set of diagonally arranged both corners of the TMD mass 86 and two slide bearings 88, 88 which are disposed on the other set of the diagonally arranged two installation bases 81, 81 in the four installation bases 81.

The cross-guide bodies 87, 87 are configured by additionally attaching lower surfaces of respective lower-side Y-direction guide parts 87a, 87a to one set of the two diagonally arranged installation bases 81, 81 in the Y-direction respectively and additionally attaching upper surfaces of upper-side x-direction guide parts 87b, 87b which are arranged orthogonally to the Y-direction guide parts 87a, 87a respectively to lower surfaces of upper base plates 84a which have the same shapes as the installation bases 81 which are affixed to one set of diagonally arranged corners of the H-shaped frame material (the H-shaped steel material) 84 of the TMD mass 86.

One slide bearing 88 in the two slide bearings 88, 88 includes a slide plate 89 which is placed on one installation base 81 in the other set of the diagonally arranged two installation bases 81, 81 and is small in frictional resistance and a columnar slide body 90 which is disposed on a central part of the slide plate 89 and slidingly moves on the slide plate 89 and whose upper surface is additionally attached to the lower surface of the upper base plate 84a which has the same shape as the installation base 81 which is affixed to one corner of the other set of diagonally arranged corners of the H-shaped frame material (the H-shaped steel material) 84 of the TMD mass 86.

The other slide bearing 88 is configured in the same manner as the above-described slide bearing 88.

Although detailed description is omitted, the Y-direction guide part 87a is configured by a combination of a Y-direction rail and a Y-direction slider and it becomes possible to cause no trouble in the Y-direction damping operation by the damping device for structure 1C according to the fourth embodiment by constructing that engagement of the Y-direction rail with the Y-direction slider is not released also when the TMD mass 86 floats.

Likewise, although detailed description is omitted, also the X-direction guide part 87a is configured by a combination of an X-direction rail and an X-direction slider and it becomes possible to cause no trouble in the X-direction damping operation by the damping device for structure 1C according to the fourth embodiment by constructing that engagement of the X-direction rail with the X-direction slider is not released also when the TMD mass 86 floats.

Incidentally, also in the damping device for structure 1C according to the fourth embodiment, it is also possible to have a configuration that an air leakage prevention mechanism unit 85 which is similar to the air leakage prevention mechanism unit 12 according to the first embodiment is added.

Furthermore, also in the damping device for structure 1C according to the fourth embodiment, it is also possible to have a configuration that elastic shock absorbing tools which are similar to the elastic shock absorbing tools 18, 49, 71 according to the first to third embodiment is added.

According to the biaxial damping type damping device for structure 1C according to the fourth embodiment, the TMD mass 86 is configured to accurately float with air and to slidingly move in two axial directions by being guided by the cross guide bodies 87 in generation of the vibration and thereby it becomes possible to execute the damping operation in a state where the sliding resistance is small and the noise is low in execution of the damping operation by the TMD mass 86 and while promoting rotation prevention and it becomes possible to accurately exhibit also the attenuation action by the slide bearing 88. Thereby, it is possible to achieve the biaxial damping type damping device for structure 1C which is able to achieve the suppression of relative displacement and the diversification of adjustment of the device natural period in generation of the vibrations such as the seismic motion and so forth and to achieve also the reductions in size and price of the damping device for structure 1C.

Incidentally, in the above-described damping devices for structure 1 to 1C according to the first to fourth embodiments, it is possible to promote performance improvement for vibration control and functional improvement for safety insurance by combining the air-floating system configuration of each of the damping devices for structures 1 to 1C with a generally used vibration control device. In addition, it is possible to freely adjust the friction force when each of the TMD masses 7, 43, 66 and 86 in the aforementioned damping devices for structure 1 to 1C vibrates in accordance with the use application of each of these damping devices 1 to 1C.

The damping device for structure according to each of the embodiments of the present invention is widely applicable as a damping device for structure or a seismic isolation device for structure relating to the building, civil engineering and mechanical structures, towering structures such as a wind turbine generator, a steel tower, an antenna tower, a bridge main tower, a sightseeing tower and so forth, various structures such as material handling laser equipment and so forth and further electric and electronic structures such as computer equipment such as a server and so forth, the control panel, semiconductor equipment and so forth, large-scale mechanical structures such as a rotary compressor and so forth and structures such as a yawing device and so forth.

The invention claimed is:

1. A damping device for structure comprising:
    four installation bases which are installed on a target place in a state of being arranged into a square shape;
    an air floating mass which is disposed on a target place which occupies a central position of the four installation bases and blows off air;
    a TMD mass which is disposed above the air floating mass, is framed with an H-shaped frame material which floats with a pressure of air sent from the air floating mass, wherein the TMD mass is a square shape in a planar view;
    two cross guide bodies which are installed on one set of the two diagonally-arranged installation bases in the four installation bases and upper parts of which are coupled to lower surfaces of one set of diagonally arranged both corners of the TMD mass respectively; and
    two slide bearings which are installed on the other set of the two diagonally arranged installation bases in the four installation bases and come into sliding contact with the other set of diagonally arranged both corners of the TMD mass.

2. The damping device for structure according to claim 1, further comprising:
    elastic shock absorbing tools fixedly arranged in a state of respectively confronting Y-direction side faces of the TMD mass.

3. The damping device for structure according to claim 1, further comprising:
    an air leak prevention mechanism unit which is disposed over an entire inner side of a lower-surface outer peripheral part of the TMD mass to prevent air leakage through a lower surface of the TMD mass when the TMD mass floats.

* * * * *